(12) United States Patent
Chang

(10) Patent No.: US 7,662,464 B2
(45) Date of Patent: Feb. 16, 2010

(54) ANTI-REFLECTION COATING WITH LOW RESISTIVITY FUNCTION AND TRANSPARENT CONDUCTIVE COATING AS OUTERMOST LAYER

(75) Inventor: Cheng-Chieh Chang, Hsinchu (TW)

(73) Assignee: Innovation & Infinity Global Corp., Hsinchu (TW)

( * ) Notice: Subject to any disclaimer, the term of this patent is extended or adjusted under 35 U.S.C. 154(b) by 352 days.

(21) Appl. No.: 11/730,772

(22) Filed: Apr. 4, 2007

(65) Prior Publication Data

US 2008/0248219 A1    Oct. 9, 2008

(51) Int. Cl.
*B32B 7/00* (2006.01)
*B32B 15/00* (2006.01)

(52) U.S. Cl. .................. 428/212; 428/216; 428/336; 428/472; 428/432; 428/688; 428/689; 428/697; 428/699; 428/701; 428/702

(58) Field of Classification Search ............ None
See application file for complete search history.

(56) References Cited

U.S. PATENT DOCUMENTS

| | | | |
|---|---|---|---|
| 4,921,760 A | 5/1990 | Tani et al. | |
| 5,091,244 A | 2/1992 | Bjornard | |
| 5,105,310 A | 4/1992 | Dickey | |
| 5,147,125 A | 9/1992 | Austin | |
| 5,170,291 A | 12/1992 | Szczyrbowski et al. | |
| 5,216,542 A | 6/1993 | Szczyrbowski et al. | |
| 5,362,552 A | 11/1994 | Austin | |
| 5,407,733 A | 4/1995 | Bjornard et al. | |
| 5,541,770 A | 7/1996 | Pellicori et al. | |
| 5,579,162 A | 11/1996 | Bjornard et al. | |
| 5,728,456 A | 3/1998 | Adair et al. | |
| 5,783,049 A | 7/1998 | Bright et al. | |
| 6,589,658 B1 * | 7/2003 | Stachowiak | 428/432 |
| 2002/0086164 A1 * | 7/2002 | Anzaki et al. | 428/432 |

* cited by examiner

*Primary Examiner*—Ling Xu
(74) *Attorney, Agent, or Firm*—Rosenberg, Klein & Lee

(57) ABSTRACT

An anti-reflection coating anti-reflection coating with low resistivity function and transparent conductive coating as outermost layer is disclosed. The anti-reflection coating contains a transparent conductive oxide as a surface layer and has a photo reflectance below 0.5%. The resistivity of the anti-reflection coating is between 0.5Ω and 0.7Ω per square, and its transparency is between 55% and 70%.

14 Claims, 2 Drawing Sheets

ANTI-REFLECTION COATING WITH LOW RESISTIVITY FUNCTION AND TRANSPARENT CONDUCTIVE COATING AS OUTERMOST LAYER

BACKGROUND OF THE INVENTION

1. Field of the Invention

The present invention relates to an anti-reflection coating with a low resistivity function and a transparent conductive coating which can be used as an as outermost layer. In particular, this invention relates to a multi-layer system that has a high anti-reflection effect.

2. Description of the Related Art

An anti-reflection multi-layer system is usually used as a plastic substrate, a glass substrate, or a plastic web. A great number of multi-layer systems have previously been disclosed.

U.S. Pat. No. 4,921,760 discloses a multi-layer anti-reflection coating with excellent adhesion between the $CeO_2$ layer and the synthetic resin. The layer system includes $CeO_2$, $Al_2O_3$, $ZrO_2$, $SiO_2$, $TiO_2$, and $Ta_2O_5$. All the thin films of the layer system are oxide materials. There are 3 to 5 thin layers in the layer system. For example, the total thickness of the 5-layered structure is about 3580 angstroms. The material of the surface layer of the layer system is $SiO_2$, which scores low on the refractive index at about 1.46 at 550 nm.

U.S. Pat. No. 5,105,310 discloses a multi-layered anti-reflection coating designed for in-line coating matched with reactive sputtering. The layered system includes $TiO_2$, $SiO_2$, $ZnO$, $ZrO_2$, and $Ta_2O_5$. All the thin films of the layered system are oxide materials. There are 4 to 6 thin layers in the layer system. For example, the total thickness of the 6-layered structure is about 4700 angstroms. The material of the surface layer of the layer system is $SiO_2$, which scores low on the refractive index at about 1.46 at 550 nm.

U.S. Pat. Nos. 5,091,244 and 5,407,733 discloses a new type of electric conductive light-attenuating anti-reflection coating. The major claim is an article comprising of nitrides of a certain transition metal that provides an electrically conductive, light-attenuating, anti-reflection surface. The layer system includes $TiN$, $NbN$, $SnO_2$, $SiO_2$, $Al_2O_3$, and $Nb_2O_5$. The thin films of the layer system are nitride and oxide materials. There are 3 to 4 thin layers in the layer system. For example, the total thickness of the 4-layer structure is about 1610 angstroms. The transmission of visible light through these two-layer systems is less than 50%. The material of the surface layer of the layer system is $SiO_2$, which scores low on the refractive index at about 1.46 at 550 nm.

U.S. Pat. No. 5,147,125 discloses a multi-layered, anti-reflection coating using zinc oxide that provides shielding from UV wavelengths shorter than 380 nm. The layered system includes $TiO_2$, $SiO_2$, $ZnO$, and $MgF_2$. All the thin films of the layered system are made of oxide or fluorine. There are 4 to 6 thin layers in the layer system. For example, the total thickness of the 5-layer structure is about 7350 angstroms. The material of the surface layer of the layer system is $MgF_2$, which scores low on the refractive index at about 1.38 at 550 nm.

U.S. Pat. No. 5,170,291 discloses a 4-layer system, which is optically effective and has a high anti-reflective effect. The layers can be formed via a pyrolytic method, a plasma-supported chemical vapor deposition method, a sputtering method, or a chemical deposition method. The layered system includes $SiO_2$, $TiO_2$, $Al_2O_3$, $ZnS$, $MgO$, and $Bi_2O_3$. For example, the total thickness of the 4-layered structure is about 2480 angstroms. The material of the surface layer of the layered system is $SiO_2$, which scores low on the refractive index at about 1.46 at 550 nm.

U.S. Pat. No. 5,216,542 discloses a 5-layered coating with a high anti-reflection effect. The process uses an adhesive layer of Ni, Cr, or NiCr metal with a thickness of about 1 nm (nanometer). The other four layers are composed of $SnO_2$, $ZrO_2$, $ZnO$, $Ta_2O_5$, $NiO$, $CrO_2$, $TiO_2$, $Sb_2O_3$, $In_2O_3$, $Al_2O_3$, $SiO_2$, $TiN$, and $ZrN$. For example, the total thickness of the 5-layered structure is about 2337 angstroms. The transmission of visible light through this layered system is less than 30%. The material of the surface layer of the layered system is $SiO_2$, which scores low on the refractive index at about 1.46 at 550 nm.

U.S. Pat. No. 5,541,770 discloses a light attenuating anti-reflection coating including electrically conductive layers. It is a four or five-layer system. A light absorption high refractive index metal such as Cr, Mo, or W is used as an optically effective thin film in the layer system. The other three or four layers are $TiO_2$, $ITO$, $Al_2O_3$, $SiO_2$, or $TiN$. The patent discloses that the major materials of the layer system are oxide and nitride, and only one metal film is used as an optically effective thin film in the anti-reflection coating. For example, the total thickness of the 5-layer structure is about 1495 angstroms. The transmission of visible light through this layer system is less than 60%. The material of the surface layer of the layer system is $SiO_2$, which scores low on the refractive index at about 1.46 at 550 nm.

U.S. Pat. No. 5,362,552 discloses a 6-layer anti-reflection coating including three layers of an electrically conductive metal oxide. The layer system includes $SiO_2$, $ITO$, $Nb_2O_5$, and $Ta_2O_5$. A total optical thickness of up to about one-wavelength of visible light of the electrically conductive metal oxide may be included in the coating. As an example of the 6-layer structure, the materials and thickness of the major two layers within this 6-layer system are $SiO_2$ (854 angstroms), and ITO (1975 angstroms). Moreover, the material of the surface layer of the layer system is $SiO_2$, which scores low on the refractive index at about 1.46 at 550 nm.

U.S. Pat. No. 5,579,162 discloses a 4-layer anti-reflection coating for a temperature sensitive substrate such as plastic. One layer is a DC reactively sputtered metal oxide that may be deposited quickly and without imparting a large amount of heat to the substrate. The layer system includes $SnO_2$, $SiO_2$, and ITO. For an example of the 4-layered structure, the materials and thickness of the major two layers within this system are $SnO_2$ (763 angstroms), and $SiO_2$ (940 angstroms). The material of the surface layer of the layer system is $SiO_2$, which scores low on the refractive index at about 1.46 at 550 nm.

U.S. Pat. Nos. 5,728,456 and 5,783,049 disclose an improved way to deposit anti-reflection coating on plastic film. The multi-layer thin film is coated via a roller coating with a sputtering process. The layer system includes ITO, $SiO_2$, and a thin lubricating covering layer that is a solvent-soluble fluoropolymer. For example, the total thickness of the 6-layer system is about 2630 angstrom. The material of the surface layer of the layer system is $SiO_2$, which scores low on the refractive index at about 1.46 at 550 nm.

The above descriptions show clearly that the materials of the thin surface layer of the conventional optical layer system are $SiO_2$ or $MgF_2$, which score low on the refractive index at about 1.46 and 1.38 at 550 nm, respectively.

It is well known that the conventional layer structure for an anti-reflection optical coating has a general principle. This general principle is that the surface layer of the optical coating should be a material that scores low on the refractive index such as $SiO_2$, scoring 1.46 on the refractive index, or $MgF_2$, scoring 1.38 on the refractive index. However, when we apply the anti-reflection coating on a display screen to create an anti-static effect for a computer monitor, or low reflection glass for an LCD or a PDP, there are some bottlenecks in the process for high volume mass production. The basic reason for this is that in the conventional optical layer structure the conductive layer is buried by an insulating layer, for example $SiO_2$ or $MgF_2$.

In the general design rule for an anti-reflection coating, the first layer deposited on the substrate surface is a material with a high score on the refractive index (hereafter referred to as H), which is then followed by a second layer which is a material with a low score on the refractive index (hereafter referred to as L). The basic design rule for the conventional anti-reflection coating is that there is a layer structure such as HLHL or HL HL HL. In a simple case, if the materials of H are ITO and the materials of L are $SiO_2$, the 4-layered structure is glass/ITO/$SiO_2$/ITO/$SiO_2$. Because ITO is a transparent conductive material, the multi-layer coating of this layer structure has electrical conductivity of less than 100 Ω/square, and can be used as an EMI shielding and/or electric static discharge when the conductive coating layer is bonded to the ground. However, a troubling phenomenon is that if the surface material of the conventional optical layer structure is $SiO_2$, the typical thickness of the $SiO_2$ layer is about 1000 Å. The material characteristic of $SiO_2$ is that it has a high density, inert properties in chemicals and is a very good insulating layer for electricity. In the process of applying a conventional anti-reflection coating to a display screen, it is difficult to make an electrical contact with the buried ITO layer that is isolated by the outermost $SiO_2$ layer. For a typical grounding process to make a metal contact with the ITO layer, an ultrasonic welding procedure is needed to break the insulating layer ($SiO_2$) and to make sure a good contact of tin solder is made with the buried ITO conductive layer. This process slows down the application of anti-reflection coating in high volume production.

Alternatively, an ultra-sonic welding process produces small and bright contamination because of the liquid tin, and the explosive energy of the ultra-sonic process. This process also produces inconsistent contact resistance for each bus bar line because the ultrasonic-welding process cannot consistently break the insulating coating at the same depth evenly and obtain a uniform contact resistance with the ITO layer.

The drawbacks mention above will reduce the yield and reliability of the manufacturing process for the application of conventional anti-EMI and anti-reflection coating.

SUMMARY OF THE INVENTION

One particular aspect of the present invention is to provide an anti-reflection coating with a low resistivity function and a transparent conductive coating which can be used as an as outermost layer. The anti-reflection layer system is composed of 8 oxide layers, and the material of the surface layer is a transparent conductive layer that scores high (between 1.9 to 2.2) on the refractive index.

Another particular aspect of the present invention is to provide an anti-reflection coating with a low resistivity function and a transparent conductive coating which can be used as an as outermost layer. The process of manufacturing the oxide thin film in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web coating for more than twenty years.

A further particular aspect of the present invention is to provide an anti-reflection coating with a low resistivity function and a transparent conductive coating which can be used as an as outermost layer. The layer structure is HL(HL)6H. The anti-reflection coating is composed of 8 layers of oxide materials, and the material of the surface layer is a transparent conductive layer that scores high (between 1.9 to 2.2) on the refractive index. In one embodiment, the material of the surface layer is a kind of transparent conductive coating, such as $SnO_2$, $ZnO_2$, $In_2O_3$, or ITO.

A further particular aspect of the present invention is to provide an anti-reflection coating with a low resistivity function and a transparent conductive coating which can be used as an as outermost layer. The material of the surface layer of the low resistivity light attenuation anti-reflection coating is a transparent conductive layer. The photopia reflective index of the transparent surface conductive layer is below 0.5%. The resistivity of the anti-reflection coating is as low as 0.5 Ω/square to 0.7 Ω/square, and its transparency is between 55% and 70%.

Because the surface layer has good electrical conductive properties, the layer system reduces much of the work in the grounding process and also increases the total yield and reliability in high volume production. The present invention provides a surface conductive layer structure with an anti-reflection coating that can be applied to the LCD and PDP display industries for glass and plastic film substrates.

In one embodiment of the present invention of the anti-reflection coating, there are 15 layers, namely, the first, second, third, . . . and fifteenth layers in consecutive numerical order beginning with the layer furthest from the substrate. Each layer is described in terms of physical or optical thickness. The optical thickness is a mathematical product of a layer's thickness and its score on the refractive index. It is described as a fraction of a designed wavelength. In the present invention the designed wavelength is about 520 nm.

The first layer or the surface layer is a transparent conductive oxide material. The oxide layer is preferably SnO:Sb slightly absorption for visible light, which scores between 1.9 and 2.2 on the refractive index at a wavelength of about 520 nanometers (nm) and has a physical thickness of 20 nm to 40 nm at the designed wavelength.

The second layer is a thin metal material. The metal layer is preferably silver, is slightly absorbent of visible light, scores between 0.1 and 0.5 on the refractive index, at a wavelength of about 520 nm, and has a physical thickness of 8 to 12 nm at the designed wavelength.

The third layer is an oxide material. The oxide layer is preferably SnO:Sb, is slightly absorbent of visible light, scores between 1.9 and 2.2 on the refractive index at a wavelength of about 520 nanometers (nm) and has a physical thickness of 30 nm to 80 nm at the designed wavelength.

The fourth layer is a thin metal material. The metal layer is preferably silver, is slightly absorbent of visible light, scores between 0.1 and 0.5 on the refractive index at a wavelength of about 520 nm and has a physical thickness of between 8 and 12 nm.

The fifth layer is an oxide material. The oxide layer is preferably SnO:Sb, is slightly absorbent of visible light, scores between 1.9 and 2.2 on the refractive index at a wavelength of about 520 nanometers (nm) and has a physical thickness of between 30 nm and 80 nm at the designed wavelength.

The sixth layer is a thin metal material. The metal layer is preferably silver, is slightly absorbent of visible light, scores between 0.1 and 0.5 on the refractive index at a wavelength of about 520 nm and has a physical thickness of between 8 and 12 nm.

The seventh layer is an oxide material. The oxide layer is preferably SnO:Sb, is slightly absorbent of visible light, scores 1.9 to 2.2 on the refractive index at a wavelength of about 520 nanometers (nm) and has a physical thickness of between 30 nm to 80 nm at the designed wavelength.

The eighth layer is a thin metal material. The metal layer is preferably silver, is slightly absorbent of visible light, scores between 0.1 and 0.5 on the refractive index at a wavelength of about 520 nm and has a physical thickness of between 8 nm to 12 nm.

The ninth layer is an oxide material. The oxide layer is preferably SnO:Sb, is slightly absorbent of visible light, scores between 1.9 and 2.2 on the refractive index at a wavelength of about 520 nanometers (nm) and has a physical thickness of between 30 nm and 80 nm at the designed wavelength.

The tenth layer is a thin metal material. The metal layer is preferably silver, is slightly absorbent of visible light, scores between 0.1 and 0.5 on the refractive index at a wavelength of about 520 nm and has a physical thickness of between 8 nm to 12 nm.

The eleventh layer is an oxide material. The oxide layer is preferably SnO:Sb, is slightly absorbent of visible light, scores between 1.9 to 2.2 on the refractive index at a wavelength of about 520 nanometers (nm) and has a physical thickness of between 30 nm and 80 nm at the designed wavelength.

The twelfth layer is a thin metal material. The metal layer is preferably silver, is slightly absorbent of visible light, scores between 0.1 and 0.5 on the refractive index at a wavelength of about 520 nm and has a physical thickness of between 8 nm to 12 nm.

The thirteenth layer is an oxide material, the oxide layer is preferably SnO:Sb, is slightly absorbent of visible light, scores between 1.9 and 2.2 on the refractive index at a wavelength of about 520 nanometers (nm) and has a physical thickness of 30 nm to 80 nm at the designed wavelength.

The fourteenth layer is a thin metal material. The metal layer is preferably silver, is slightly absorbent of visible light, scores between 0.1 and 0.5 on the refractive index at a wavelength of about 520 nm and has a physical thickness of between 8 nm to 12 nm.

The fifteenth or the innermost layer is an oxide material. The oxide layer is preferably TiO2, is substantially non-absorbent of visible light, scores between 2.2 and 2.4 on the refractive index at a wavelength of about 520 nm and has a physical thickness of between 20 nm to 40 nm at the designed wavelength.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention relates to an oxide based anti-reflection coating with 15 layers. The thickness value of each layer is specified as either a physical thickness in nm, as an optical thickness in the form of a fraction, or as a multiple of a wavelength of visible light. The typical value is 520 nm.

Figure 1:
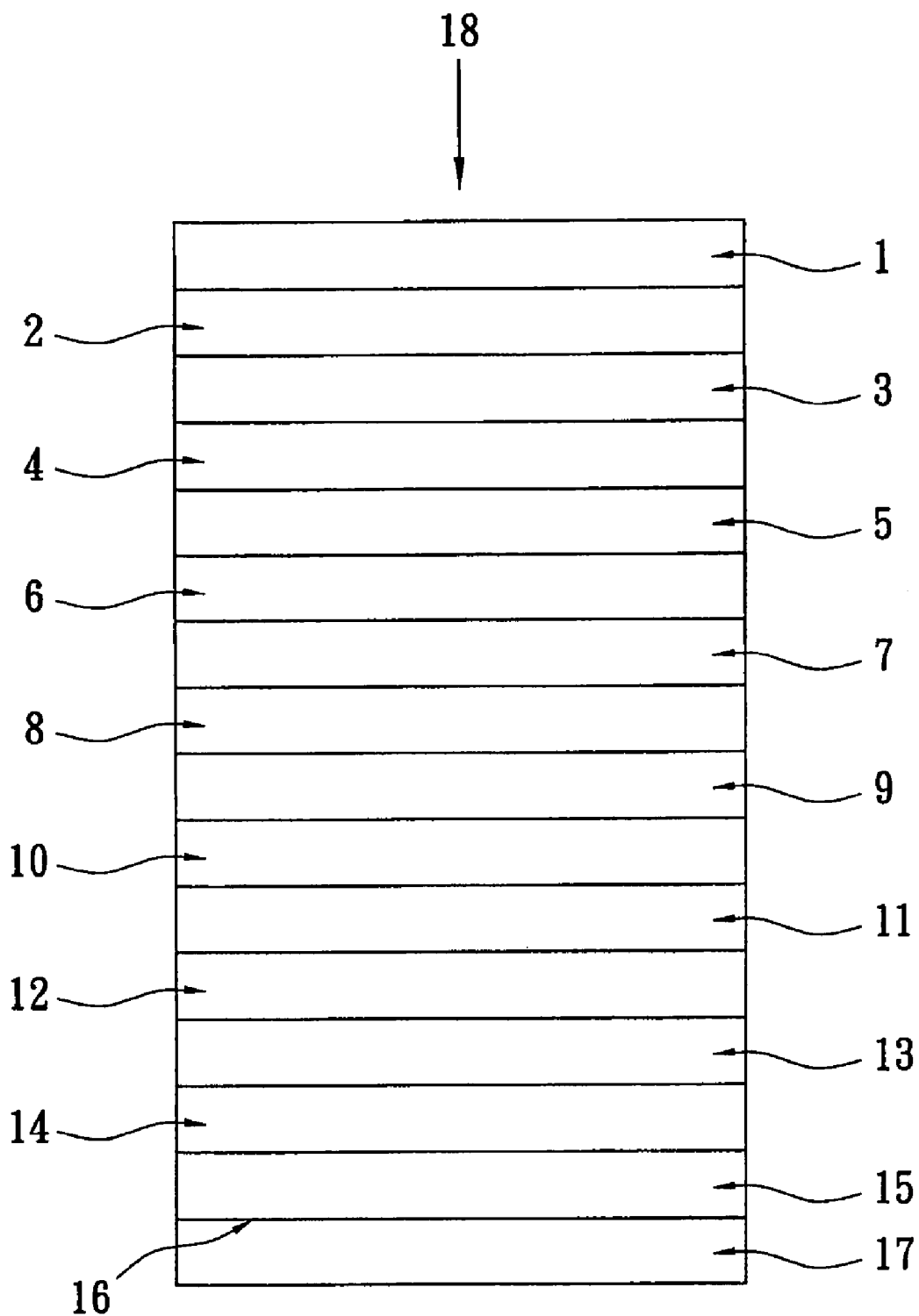
FIG. 1 is a schematic diagram of the anti-reflection coating with low resistivity function and transparent conductive coating as outermost layer of the present invention.

Reference is made to FIG. 1. A substrate 17 is composed of glass, a plastic film, or other transparent materials. A front surface 16 of the substrate 17 is that side of the substrate 17 that is facing the observer. An arrow 18 indicates the direction of viewing. A layer, which contacts the front surface 16 of the substrate 17, is named a fifteenth layer 15. In the direction the observer follows, the fourteenth layer 14 is arranged on the fifteenth layer 15, which is next to the front surface of the substrate 17. The thirteenth layer 13 is arranged on the fourteenth layer 14. The twelfth layer 12 is arranged on the thirteenth layer 13. The eleventh layer 11 is arranged on the twelfth layer 12. The tenth layer 10 is arranged on the eleventh layer 11. The ninth layer 9 is arranged on the tenth layer 10. The eighth layer 8 is arranged on the ninth layer 9. The seventh layer 7 is arranged on the eighth layer 8. The sixth layer 6 is arranged on the seventh layer 7. The fifth layer 5 is arranged on the sixth layer 6. The fourth layer 4 is arranged on the fifth layer 5. The third layer 3 is arranged on the fourth layer 4. The second layer 2 is arranged on the third layer 3. The first layer 1 is arranged on the second layer 2. The first layer 1 is called as a surface layer or outermost layer. The layers 1, 2, 3, 4, 5, 6, 7, 8, 9, 10, 11, 12, 14 and 15 form a layered system of the present invention.

The first (also known as the surface layer 1) is a SnO:Sb layer (capable of) slightly absorbent of visible light, and scores between 1.9 and 2.2 on the refractive index at a wavelength of about 520 nanometers (nm) and has a physical thickness of between 20 nm to 40 nm at the designed wavelength. The second layer 2 is a silver layer slightly absorbent of visible light, and scores between 0.1 and 0.5 on the refractive index at a wavelength of about 520 nm and has a physical thickness of between 8 nm to 12 nm at the designed wavelength. The third layer 3 is a SnO:Sb layer, and scores between 1.9 and 2.2 on the refractive index at a wavelength of about 520 nanometers (nm) and has a physical thickness of between 30 nm to 80 nm at the designed wavelength. The fourth layer 4 is a silver layer, and scores between 0.1 and 0.5 on the refractive index at a wavelength of about 520 nm and has a physical thickness of between 8 nm to 12 nm. The fifth layer 5 is a SnO:Sb layer, and scores between 1.9 and 2.2 on the refractive index at a wavelength of about 520 nanometers (nm) and has a physical thickness of between 30 nm to 80 nm at the designed wavelength. The sixth layer 6 is a silver layer, and scores between 0.1 and 0.5 on the refractive index at a wavelength of about 520 nm and has a physical thickness of between 8 nm to 12 nm. The seventh layer 7 is a SnO:Sb layer, and scores between 1.9 and 2.2 on the refractive index at a wavelength of about 520 nanometers (nm) and has a physical thickness of between 30 nm to 80 nm at the designed wavelength. The eighth layer 8 is a silver layer, and scores between 0.1 and 0.5 on the refractive index at a wavelength of about 520 nm and has a physical thickness of between 8 nm to 12 nm. The ninth layer 9 is a SnO:Sb layer, and scores between 1.9 and 2.2 on the refractive index at a wavelength of about 520 nanometers (nm) and has a physical thickness of between 30 nm to 80 nm at the designed wavelength. The tenth layer 10 is a silver layer, and scores between 0.1 and 0.5 on the refractive index at a wavelength of about 520 nm and has a physical thickness of between 8 nm to 12 nm. The eleventh layer 11 is a SnO:Sb layer, and scores between 1.9 and 2.2 on the refractive index at a wavelength of about 520 nanometers (nm) and has a physical thickness of between 30 nm to 80 nm at the designed wavelength. The twelfth layer 12 is a silver layer, scores between 0.1 and 0.5 on the refractive index at a wavelength of about 520 nm, and has a physical thickness of between 8 nm to 12 nm. The thirteenth layer 13 is a SnO:Sb layer, scores between 1.9 and 2.2 on the refractive index at a wavelength of about 520 nanometers (nm), and has a physical thickness of between 30 nm to 80 nm at the designed wavelength. The fourteenth layer 14 is a thin metal material. The metal layer is made of silver slightly absorbing visible light, scores between 0.1 and 0.5 on the refractive index at a wavelength of about 520 nm, and has a physical thickness of between 8 nm to 12 nm. The fifteenth or the innermost layer 15 is a TiO2 layer substantially non-absorbing visible light, scores between 2.2 and 2.4 on the refractive index at a wavelength of about 520 nm, and has a physical thickness of between 20 nm to 40 nm at the designed wavelength.

In a preferred embodiment, the thickness of the first layer 1 is 35 nm. The thickness of the second layer 2 is 10 nm. The thickness of the third layer 3 is 75 nm. The thickness of the fourth layer 4 is 10 nm. The thickness of the fifth layer 5 is 55 nm. The thickness of the sixth layer 6 is 10 nm. The thickness of the seventh layer 7 is 55 nm. The thickness of the eighth layer 8 is 10 nm. The thickness of the ninth layer 9 is 55 nm. The thickness of the tenth layer 10 is 10 nm. The thickness of the eleventh layer 11 is 70 nm. The thickness of the twelfth layer 12 is 10 nm. The thickness of the thirteenth layer 13 is 70 nm. The thickness of the fourteenth layer 14 is 10 nm. The thickness of the fifteenth layer 15 is 33 nm.

A DC or AC magnetron sputtering is provided to deposit the first, third, fifth, seventh, ninth, eleventh and 1 thirteenth layers 1, 3, 5, 7, 9, 11 and 13 from a SnO:Sb target in the presence of a sputter gas of Ar and a very small partial pressure of $H_2O$, under a given total pressure of approximately 3 m Torr (m=mili=0.001). For the second, fourth, sixth, eighth, tenth, twelfth and fourteenth layers 2, 4, 6, 8, 10, 12 and 14, it is proposed that a DC or AC magnetron sputtering from the silver target to generate a layer of silver in the presence of a sputter gas of Ar, under a given pressure of 4 m Torr, should be used. For the 15$^{th}$ layer 15, it is proposed that an AC sputtering from the Ti target to generate a layer of $TiO_2$ in the presence of a sputter gas mixture comprising Ar and $H_2O$, under a given pressure of approximately 2 m Torr, should be used. The distance between the target and the substrate 17 is about 15 cm. A heating device is applied in the sputtering system. The substrate 17 temperature is maintained between 100 and 300° C. during the sputtering process.

The number of layers is not limited to 15. Any layer system that meets the design rule of $HL(HL)_nNH$ is within the scope of the present invention.

Figure 2:
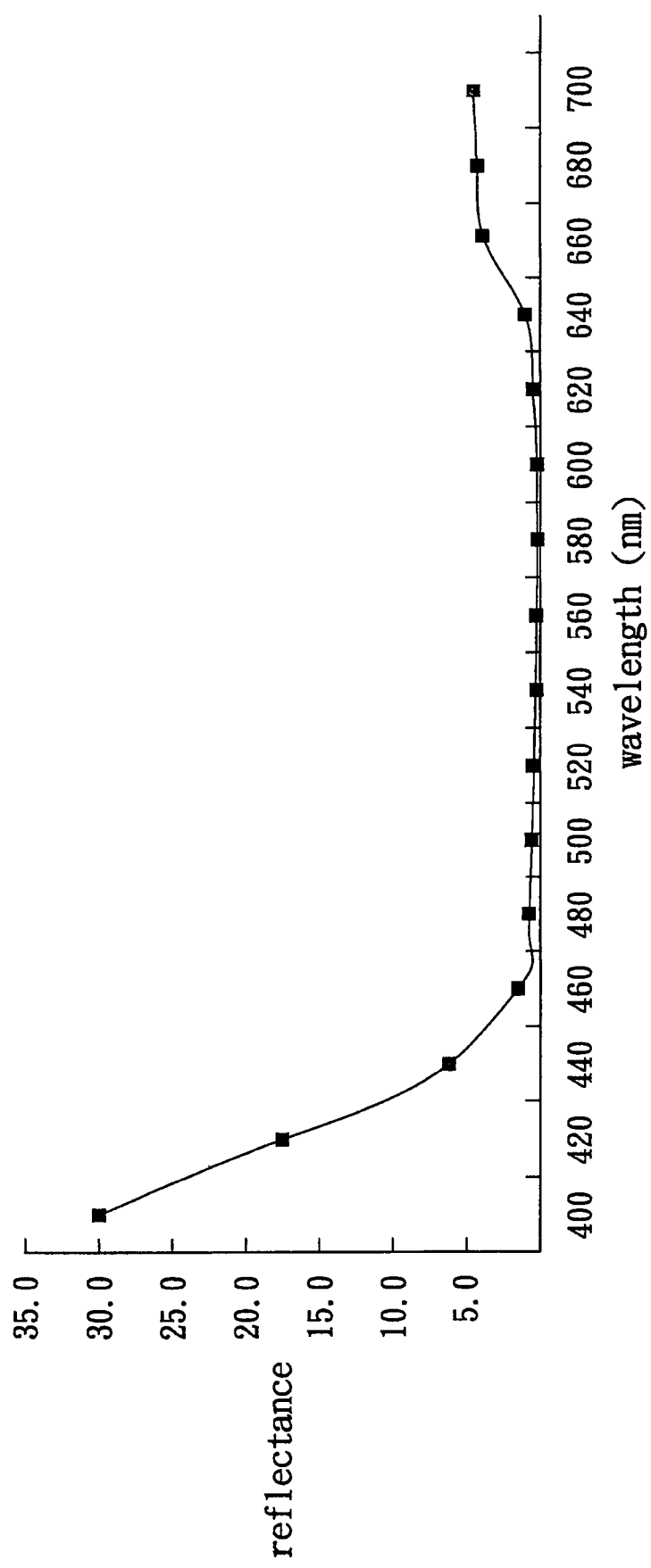
FIG. 2 is a curve diagram of the relationship between the reflection rate and the wavelength of the anti-reflection coating with low resistivity function and transparent conductive coating as outermost layer of the present invention.

FIG. 2 shows the reflection spectrum for the layer system. The reflection was measured in percent at the front surface of the glass. The visible spectrum extends from a wavelength of 400 nm to a wavelength of 700 nm. The curve reveals clearly that the reflection in the core wavelength region of the visible light particularly between 460 and 600 nm is extraordinarily low. It lies below 0.5%. This result is better than the reflection spectrum measured from the layer system of the prior art with a design of HLHL.

The stated objects are achieved by the present invention. A conductive front surface with a resistance between 0.5 Ω/square~0.7 Ω/square is obtained from the ITO coating, and a smooth wide band reflection spectrum is obtained on the glass or plastic film in the visible range from 400 nm to 700 nm. A highly conductive, light attenuation anti-reflection coating with a good surface conductivity is produced. Furthermore, a roll-to-roll vacuum deposition system is used to deposit the layer system of the present invention so that it can be manufactured at a low cost using high volume manufacturing methods.

The layer system of the present invention is also highly conductive for EMI (Electromagnetic Interference) shielding, has low reflectivity for optical viewing, is highly scratch resistance for surface hardness, and has moderate light attenuation effects for manufacturing PDP displays. For instance, the layer system has a surface resistance of between 0.5 Ω/square and 0.7 Ω/square and is hard enough to pass the scratch test of military standard MIL-C-48497.

The following advantages are achieved by the present invention. The problem of the transparent conductive layer (for example ITO), which was isolated by an insulating SiO2 film in a conventional anti-reflection layer system, is solved. The present invention provides a 15-layer system in which the surface material is SnO:Sb and scores between 1.9 and 2.2 on the refractive index.

Because the surface layer of the anti-reflection coating is electrical conductive, several simple processes can be applied to easily achieve a good electrical contact with the anti-reflection coating. For example, this layer system is used in a screen filter for plasma display.

On the application of a screen filter, the conventional grounding method of using an ultra-sonic welding process that produces small and bright contamination of tin spots will be replaced. The final process of assembling an anti-reflection coating on the screen filter will be simplified. The problem of forming non-uniform electric contact between the isolated conductive ITO layer and the tin solder will be solved. The yield of the grounding process will increase. The layered structure can also be used as a basic coating in the plasma display and liquid crystal display manufacturing industries.

Accordingly, the present invention of a 15-layer system composed of electrically conductive materials to produce a surface layer is a simple and easy economic process for producing an anti-reflection coating on glass and plastic film substrates with low resistance.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An anti-reflection coating with low resistivity function and transparent conductive coating as outermost layer, comprising:
   a substrate;
   a fifteenth layer arranged on a front surface of the substrate, said fifteenth layer being composed of $TiO_2$ and scoring high on a refractive index, wherein the physical thickness of the fifteenth layer is approximately 33 nm;
   a fourteenth layer arranged on said $TiO_2$, fifteenth layer and composed of a metal scoring low on the refractive index, wherein the physical thickness of the fourteenth layer is between 8nm and 12nm;
   a thirteenth layer arranged on the fourteenth layer and composed of an oxide scoring high on the refractive index, wherein the physical thickness of the thirteenth layer is between 30nm and 80nm;

a twelfth layer arranged on the thirteenth layer and composed of a metal scoring low on the refractive index, wherein the physical thickness of the twelfth layer is between 8nm and 12nm;

an eleventh layer arranged on the twelfth layer and composed of an oxide scoring high on the refractive index, wherein the physical thickness of the eleventh layer is between 30nm and 80nm;

a tenth layer arranged on the eleventh layer and composed of a metal scoring low on the refractive index, wherein the physical thickness of the tenth layer is between 8nm and 12nm;

an ninth layer arranged on the tenth layer and composed of an oxide scoring high on the refractive index, wherein the physical thickness of the ninth layer is between 30nm and 80nm;

an eighth layer arranged on the ninth layer and composed of a metal scoring low on the refractive index, wherein the physical thickness of the eighth layer is between 8nm and 12nm;

a seventh layer arranged on the eighth layer and composed of an oxide scoring high on the refractive index, wherein the physical thickness of the seventh layer is between 30nm and 80nm;

a sixth layer arranged on the seventh layer and composed of a metal scoring low on the refractive index, wherein the physical thickness of the sixth layer is between 8nm and 12nm;

a fifth layer arranged on the sixth layer and composed of an oxide scoring high on the refractive index, wherein the physical thickness of the fifth layer is between 30nm and 80nm;

a fourth layer arranged on the fifth layer and composed of a metal scoring low on the refractive index, wherein the physical thickness of the fourth layer is between 8nm and 12nm;

a third layer arranged on the fourth layer and composed of an oxide scoring high on the refractive index, wherein the physical thickness of the third layer is between 30nm and 80nm;

a second layer arranged on the third layer and composed of a metal scoring low on the refractive index, wherein the physical thickness of the second layer is between 8nm and 12nm; and a first layer arranged on the second layer and composed of an oxide scoring high on the refractive index, wherein the physical thickness of the first layer is between 20nm and 40nm;

wherein the first layer, the third layer, the fifth layer, the seventh layer, the ninth layer, the eleventh layer, and the thirteenth layer are composed of SnO:Sb, and wherein the second layer, the fourth layer, the sixth layer, the eighth layer, the tenth layer, the twelfth layer, and the fourteenth layer are composed of silver.

2. The anti-reflection coating with low resistivity function and transparent conductive coating as outermost layer as claimed in claim 1, wherein the substrate is a plastic film.

3. The anti-reflection coating with low resistivity function and transparent conductive coating as outermost layer as claimed in claim 1, wherein the substrate is glass.

4. The anti-reflection coating with low resistivity function and transparent conductive coating as outermost layer as claimed in claim 1, wherein the first layer, the third layer, the fifth layer, the seventh layer, the ninth layer, the eleventh layer, and the thirteenth layer score between 1.9 and 2.2 on the refractive index, and the second layer, the fourth layer, the sixth layer, the eighth layer, the tenth layer, the twelfth layer, and the fourteenth layer score between 0.1 and 0.5 on the refractive index, and the fifteenth layer scores between 2.2 and 2.4 on the refractive index.

5. The anti-reflection coating with low resistivity function and transparent conductive coating as outermost layer as claimed in claim 1, wherein the oxide of the first layer, the third layer, the fifth layer, the seventh layer, the ninth layer, the eleventh layer, and the thirteenth layer is formed by a DC or AC magnetron sputtering method, the metal of the second layer, the fourth layer, the sixth layer, the eighth layer, the tenth layer, the twelfth layer, and the fourteenth layer is formed by a DC or AC magnetron sputtering method, and the oxide of the fifteenth layer is formed by an AC magnetron sputtering method.

6. The anti-reflection coating with low resistivity function and transparent conductive coating as outermost layer as claimed in claim 1, wherein said first through fifteenth layers are formed by an in-line or roll-to-roll vacuum sputtering method.

7. The anti-reflection coating with low resistivity function and transparent conductive coating as outermost layer as claimed in claim 1, wherein the coating is a basic coating for a plasma display or a liquid crystal display.

8. An anti-reflection coating with low resistivity function and transparent conductive coating as outermost layer, comprising:

a substrate;

a $TiO_2$ layer arranged on the substrate, said $TiO_2$ layers scoring high on the refractive index, wherein the physical thickness of said $TiO_2$ layer ranges between 20 nm and 40 nm;

a plurality of fourth layers composed of a metal scoring low on the refractive index, wherein the physical thickness of each said fourth layer ranges between 8 nm and 10 nm;

a plurality of third layers composed of an oxide scoring high on the refractive index, wherein the physical thickness of each said third layer ranges between 30 nm and 80 nm;

a second layer composed of a metal scoring low on the refractive index, wherein the physical thickness of the second layer ranges between 8 nm and 10 nm; and a first outermost layer composed of an oxide scoring high on the refractive index, wherein the physical thickness of the first layer ranges between 20 nm and 40 nm;

wherein the plurality of fourth layers and the plurality of third layers are staggered and stacked in an alternating fashion on said $TiO_2$ layer, wherein the second layer is arranged on the last of said plurality of third layers, and the first layer is arranged on the second layer, wherein the first layer and the plurality of third layers are composed of SnO:Sb, and the second layer and the plurality of fourth layers are composed of silver.

9. The anti-reflection coating with low resistivity function and transparent conductive coating as outermost layer as claimed in claim 8, wherein the substrate is a plastic film.

10. The anti-reflection coating with low resistivity function and transparent conductive coating as outermost layer as claimed in claim 8, wherein the substrate is glass.

11. The anti-reflection coating with low resistivity function and transparent conductive coating as outermost layer as claimed in claim 8, wherein the first layer and the plurality of third layers score between 1.9 and 2.2 on the refractive index, the second layer and the plurality of fourth layers score between 0.1 and 0.5 on the refractive index, and the $TiO_2$ layer scores between 2.2 and 2.4 on the refractive index.

12. The anti-reflection coating with low resistivity function and transparent conductive coating as outermost layer as claimed in claim 8, wherein the oxide of the first layer and the plurality of third layers is formed by a DC or AC magnetron sputtering method, the metal of the second layer and the plurality of fourth layers is formed by a DC or AC magnetron sputtering method, and the $TiO_2$ layer is formed by an AC magnetron sputtering method.

13. The anti-reflection coating with low resistivity function and transparent conductive coating as outermost layer as claimed in claim 8, wherein said first, second, third, fourth and $TiO_2$ layers are formed by an in-line or roll-to-roll vacuum sputtering method.

14. The anti-reflection coating anti-reflection coating with low resistivity function and transparent conductive coating as outermost layer as claimed in claim 8, wherein the coating is a basic coating for a plasma display or a liquid crystal display.

* * * * *